Jan. 3, 1961  H. M. VALENTINE  2,967,064
LOAD CONTROL VALVE FOR VEHICLE AIR SPRINGS
Filed Sept. 13, 1957  3 Sheets-Sheet 1

INVENTOR
HARRY M. VALENTINE
BY Scrivener & Parker
ATTORNEY

Jan. 3, 1961  H. M. VALENTINE  2,967,064
LOAD CONTROL VALVE FOR VEHICLE AIR SPRINGS
Filed Sept. 13, 1957  3 Sheets-Sheet 2

INVENTOR
HARRY M. VALENTINE
BY Scrivener & Parker
ATTORNEY

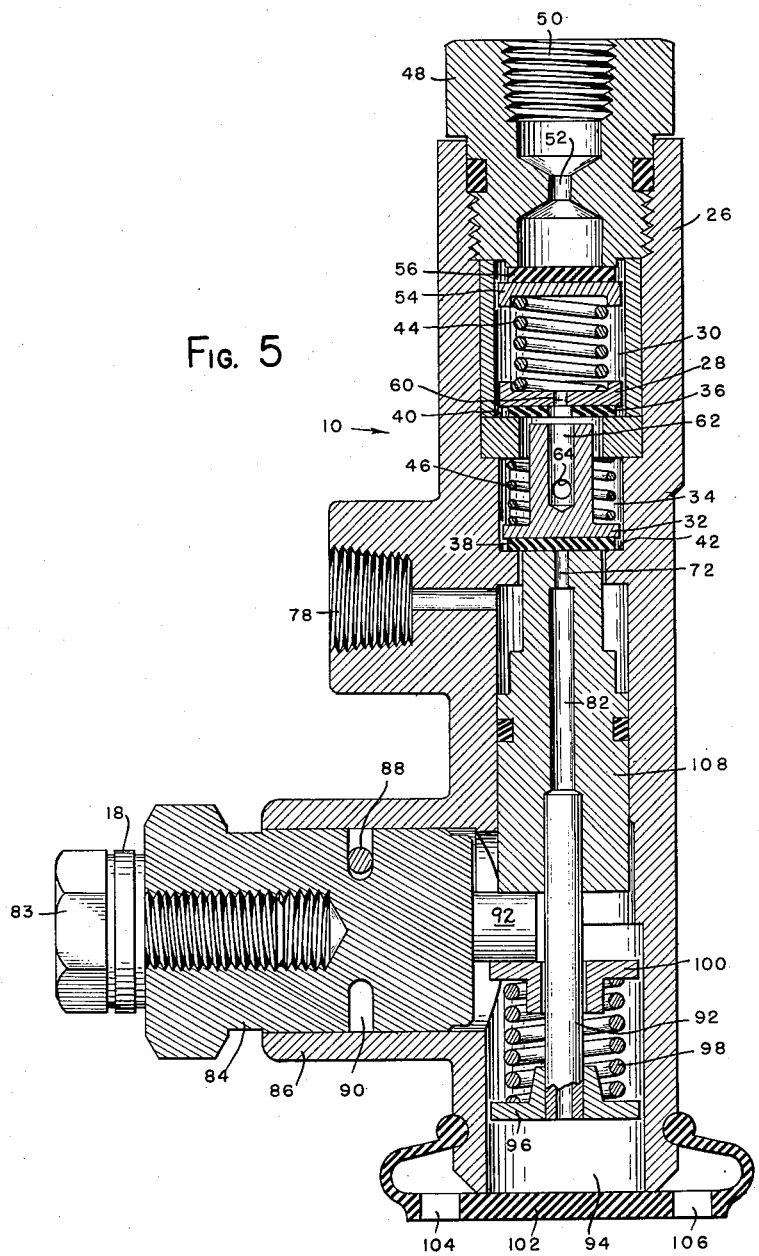

United States Patent Office 2,967,064
Patented Jan. 3, 1961

2,967,064

LOAD CONTROL VALVE FOR VEHICLE AIR SPRINGS

Harry M. Valentine, Elyria, Ohio, assignor to Bendix-Westinghouse Automotive Air Brake Company, Elyria, Ohio, a corporation of Delaware Filed Sept. 13, 1957, Ser. No. 683,813

9 Claims. (Cl. 280—124)

This invention relates to motor vehicle air spring suspension systems and more particularly to an improved control valve mechanism for controlling the leveling action of the vehicle frame in response to changes in load conditions.

Various types of vehicle air spring suspension systems have heretofore been proposed wherein an air cushion, bellows or the like has been utilized between the frame and axle portions and such cushion has been inflated with compressed air to a value sufficient to support the frame a predetermined distance above the axle. Such systems have embodied various types of control devices in order that said predetermined distance between the frame and axle parts may be maintained irrespective of variations in the load conditions of the vehicle. For the most part, such control devices function in accordance with variations in the distance between the sprung and unsprung portions of the vehicle, so that as the vehicle load is increased, and the vehicle frame approaches the axle, the air pressure within the air springs is increased to bring the frame back to its proper level. Similarly, as the vehicle load is decreased and the vehicle frame moves upwardly with respect to the axle, the air pressure within the air springs is exhausted until the frame is returned to its proper level.

The main object of the present invention is to provide novel control or leveling valve mechanism for the control of air pressure in the vehicle air springs so that the vehicle frame will assume a predetermined level in accordance with variations in the loading condition of the vehicle but wherein substantially slight changes in air pressure within the air springs will take place when the vehicle is operated over-the-road.

Another object of the invention is to provide a novel leveling valve which is so constituted as to have a two capacity inlet and a two capacity exhaust such that on slight oscillations of the control lever from neutral position of the valve a small capacity of the inlet and exhaust results and on larger displacements of the lever, considerable larger inlet and exhaust capacities are available. With an arrangement of this character, the minimum amount of compressed air is depleted from the supply source on slight oscillations of the lever, which in most cases results from over-the-road travel of the vehicle rather than a demand for compressed air for vehicle leveling during changes in vehicle loading.

A further object is to provide a novel leveling valve which is thus operable to conserve the supply of compressed air during travel of the vehicle and which is operable to quickly control the vehicle air springs upon initial charging of the latter as well as when the vehicle is being loaded or unloaded.

Other objects and novel features of the invention will appear more fully hereinafter from a consideration of the following detailed description when taken in connection with the accompanying drawings. It is to be expressly understood, however, that the drawings are utilized for purposes of illustration only, reference being had to the appended claims for a definition of the limits of the invention.

In the drawings, wherein similar reference characters denote similar parts throughout the several views:

Fig. 5 is a sectional view of another form of control valve;

Figure 1:
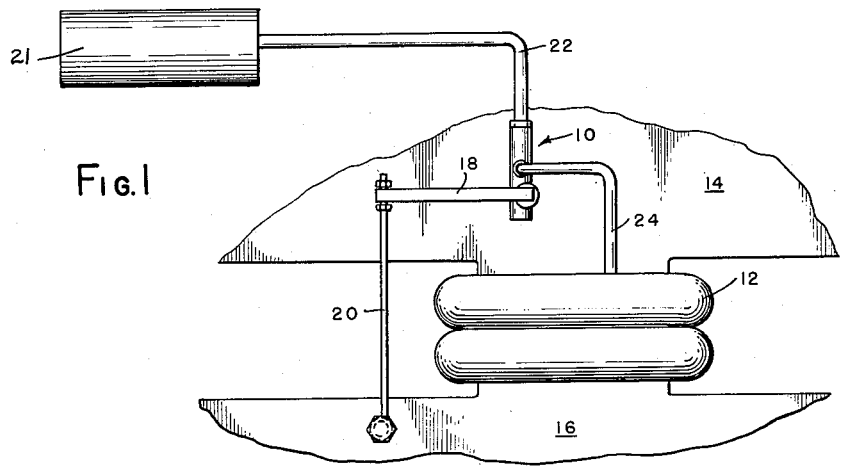
Fig. 1 is a diagrammatic view of the control valve mechanism of the present invention associated with an air spring of conventional construction.

Referring more particularly to Fig. 1, the novel control valve mechanism 10 of the present invention is illustrated therein in association with a conventional type of air spring or bellows 12, the valve mechanism being mounted on a portion 14 of the vehicle frame and the air spring being interposed between the frame portion 14 and an axle portion 16. The control valve 10 controls the flow of compressed air to and from the air spring 12 in accordance with variations in the distance between the frame portion 14 and the axle portion 16, operation of the valve being effected by oscillation of a control arm 18, the outer end of which is connected with the axle portion 16 by means of a link 20. It will be understood that the valve mechanism 10 may be used to control air springs on opposite sides of the vehicle or separate control valve mechanisms may be utilized for each air spring, if desired.

As will appear more fully hereinafter, the control valve mechanism 10 functions to control the air pressure within the air spring 12 so that a predetermined distance will be maintained between the frame and axle portions 14 and 16 regardless of variations in loading of the vehicle. Thus, in the static condition of Fig. 1, and assuming a no-load condition of the vehicle, a predetermined air pressure is trapped within the air spring 12 so that the frame portion 14 is maintained a predetermined distance above the axle portion 16. In the event the vehicle load is increased, the portions 14 and 16 will approach each other and the outer end of arm 18 will move upwardly to actuate the control valve mechanism 10 to supply additional air to the air spring 12 by way of reservoir 21 and conduits 22 and 24 to finally return the frame part 14 to the position shown. On the other hand, as the vehicle load is decreased, the expansion of the air spring 12 will cause the frame portion 14 to move upwardly with respect to the axle portion 16 and the control arm 18 will move downwardly to actuate the control valve mechanism to exhaust air from the bellows 12 to again allow the frame portion to return to the position shown.

Figure 2:
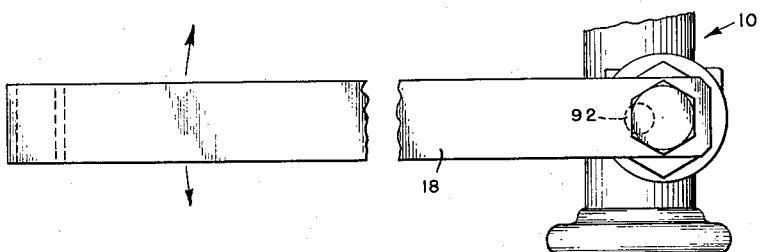
Fig. 2 is a side view of a portion of the control valve mechanism together with its control arm.
Figures 3, 4:
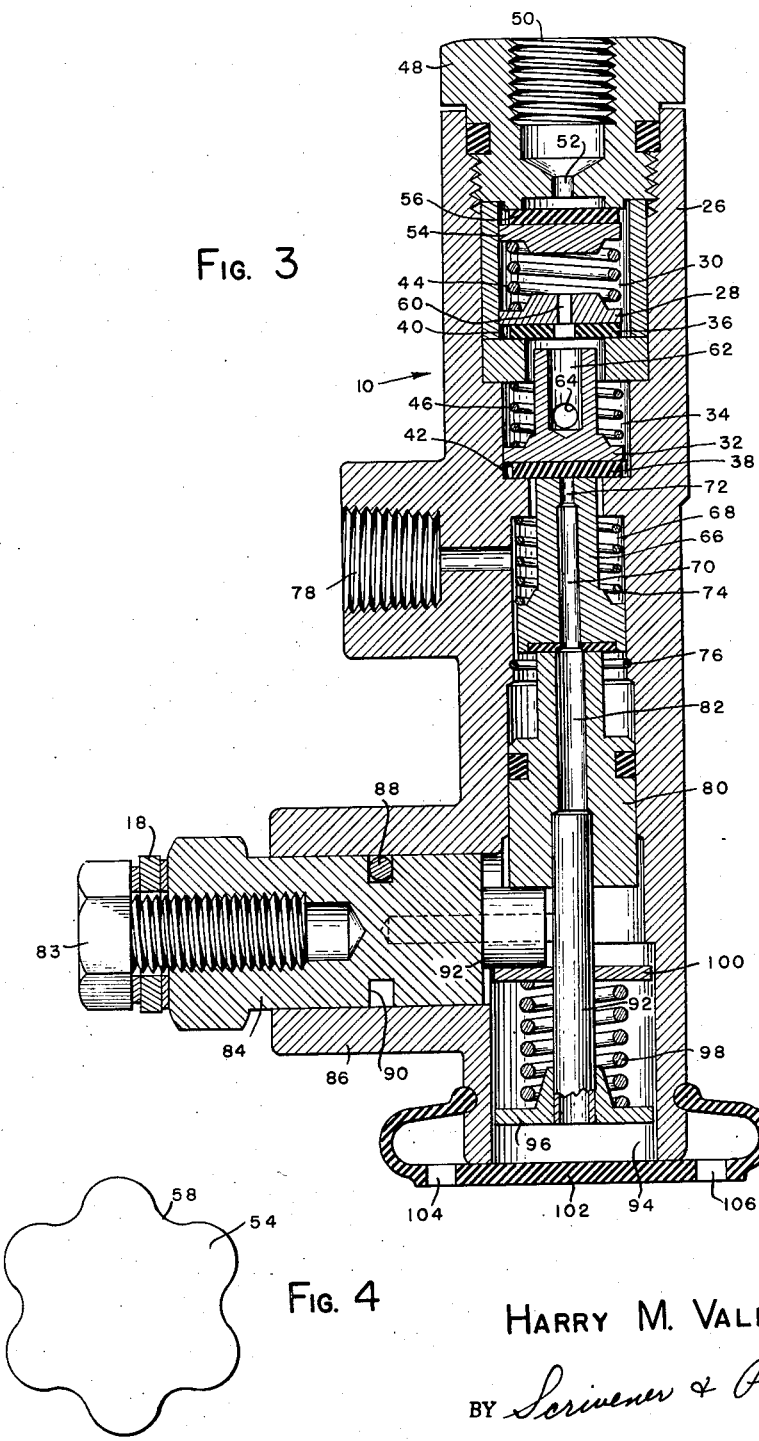
Fig. 3 is a sectional view of one form of control valve.
Fig. 4 is an enlarged plan view of one of the valve elements of Fig. 3.

The novel control or leveling valve 10 is more particularly illustrated in Figs. 2 and 3 and includes a casing 26 having a first inlet valve 28 mounted within a chamber 30 and a second inlet valve 32 mounted within a chamber 34, the valves being provided with respective rubber valve seat members 36 and 38 and being normally urged against seats 40 and 42 by springs 44 and 46 respectively. The upper portion of the casing 26 is closed by a cap 48 having a compressed air inlet opening 50 and an inlet metering orifice 52, the latter being closed against return of air to the supply reservoir 21 by means of a check valve 54 having a rubber valve seat member 56. The peripheries of the valves 28, 32, 54 and 66 are fluted or may be provided with suitable cut-away portions, as seen at 58 in Fig. 4 so that when any of the valves are opened, free flow of air past the valves may occur. In order to provide different rates of air flow to the vehicle air springs in accordance with the displacements of the control arm 18, the inlet orifice 52 is slightly larger than a metering orifice 60 in the inlet valve 28. As shown, the inlet valve 32 has an axial bore 62 and a cross-bore 64, and the upper end of the valve is adapted to engage the valve seat member 36 and move it off its seat 40 when the valve 32 is moved upwardly. When this occurs, the rate of flow of air to the chamber 34 will be determined by the larger inlet orifice 52 and corresponds to a large displacement of the control arm 18. On the other hand, when the inlet valve 28 is closed and the inlet valve 32 is moved upwardly off its seat, but does not contact the valve seat 36, the flow of air to the chamber 34 will be determined by the smaller orifice 60 in the inlet valve 28 and corresponds to a smaller displacement of the control arm 18. Thus the provision of the two inlet valves 28 and 32 and the orifices 52 and 60, of different sizes secures a two-capacity inlet for different rates of air flow depending upon the amplitude of movement of the control arm 18.

In order to secure a two-capacity exhaust, the valve 10 is provided with an exhaust plunger 66, slidably mounted within an outlet chamber 68 and provided with an axial exhaust bore 70 having a metering orifice 72 of predetermined size. A spring 74 constantly urges the plunger 66 downwardly, such downward movement being limited by a stop ring 76. In the neutral or lapped position shown in Fig. 3, the upper end of the plunger engages the valve member 38 to close communication between the outlet chamber 68 and the exhaust orifice 72. Movement of the plunger 66 upwardly beyond the lapped position will move the inlet valve 32 off its seat 42 while movement of the plunger downwardly and away from the valve 32 will open the chamber 68 to the exhaust orifice 72. Thus the valve 32 functions as a combined inlet and exhaust valve during movements of the plunger 66. Chamber 68 communicates at all times with the vehicle air spring or springs by way of an outlet port 78. An actuating plunger 80 is also slidably mounted within the outlet chamber 68 and is moved upwardly and downwardly in response to oscillation of the control arm 18 by mechanism to be later described in detail.

As shown, the plunger 80 is provided with an exhaust bore 82 of larger cross-section than the exhaust orifice 72 and the upper end of the plunger normally engages the lower end of the exhaust plunger 66 to close communication between the outlet chamber 68 and the exhaust bore 82 when the valve 10 occupies the lapped position illustrated in Fig. 3. Upon slight downward movement of the plunger 80, the exhaust plunger 66 will move away from the inlet valve member 38 to connect the chamber 68 with the exhaust orifice 72, and the rate of flow of air to exhaust will be determined by the restricted orifice 72. This will correspond to a small displacement of the lever or arm 18. During further downward movement of the plunger 80, the exhaust plunger 66 will finally contact the stop ring 76 and allow the exhaust valve, constituted by the lower end of plunger 66 and the upper end of plunger 80 to be opened. Air flow through the larger exhaust bore 82 from the chamber 68 will then occur and this corresponds to a larger displacement of the control lever 18.

For the purpose of controlling valve operation in accordance with movement of the control arm 18, the latter is connected by a screw 83 at one end to a shaft 84, the latter being rotatable in a sleeve 86 of the casing 26 and mounted against endwise movement by a screw 88 receivable within an annular groove 90 in the shaft. The inner end of the shaft 84 carries a roller 92, the center of which is positioned on the center line of the valve 10 when the parts occupy the lapped position shown in Figs. 2 and 3. Since the axis of rotation of the shaft 84 is offset from the valve center line, it will be seen that this construction provides an eccentric or cam for operating the leveling valve during oscillation of the control arm 18. As shown, the plunger 80 is provided with a hollow exhaust tube 92 which connects exhaust bore 82 with exhaust chamber 94 and the lower end of the tube is provided with an abutment 96. A precompressed spring 98 is confined between the abutment 96 and an abutment 100 and serves to maintain the lower end of the plunger 80 in constant contact with the eccentric roller 92. A resilient cap 102 encloses the lower end of the chamber 94 and serves as a dust shield for the chamber, it being observed that the cap is provided with ports 104 and 106 for connecting the chamber 94 with the atmosphere when the valve 10 is operated to exhaust air from the air springs.

A slightly modified form of leveling valve is illustrated in Fig. 5 which is similar to Fig. 3 except that instead of a two-capacity exhaust, a single capacity exhaust is provided. With such an arrangement, the two-capacity inlet of Fig. 3 is retained so that a rapid initial build-up of compressed air in the air springs is secured. During over-the-road operation, a single capacity exhaust is provided and, as in the case of Fig. 3, only a single capacity intake is contemplated due to the relatively small amplitude of movement of the control arm 18. More particularly, and referring to Fig. 5, the actuating plunger connected with the roller 92 and the exhaust plunger are formed integrally as a combined actuating and exhaust plunger 108. With such an arrangement, upward travel of the plunger 108 serves to actuate the inlet valves 32 and 28 in the same manner as in Fig. 3, to provide a single or a two-capacity inlet depending upon the displacement of the control arm 18. On the other hand, downward movement of the plunger 108 will provide a single stage exhaust as determined by the exhaust orifice 72 irrespective of the displacement of the lever 18. Aside from this difference in exhaust, the operation of the form shown in Fig. 5 is identical to that shown in Fig. 3.

Figures 6, 7:
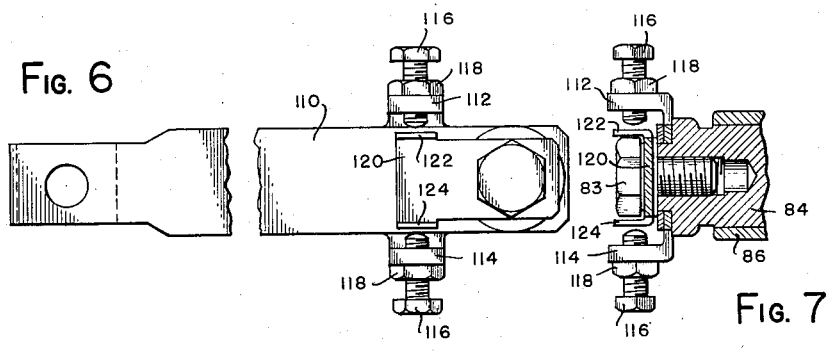
Fig. 6 is a plan view of a modified form of valve control arm.
Fig. 7 is a side view, partly in section, of the arm of Fig. 6.

A modified form of control arm for the valve 10 is illustrated in Figs. 6 and 7 wherein the arrangement is such that oscillations of the arm of relatively small amplitude, such as may be caused by over-the-road travel of the vehicle, will not operate the leveling valve. As shown, such control lever comprises an arm 110, one end of which is rotatably mounted on the shaft 84, the other end being connected with the link 20, as in Fig. 1. Arm 110 carries a yoke provided with a pair of arms 112 and 114, each of which is provided with an adjustable screw 116 having a jam nut 118 for maintaining the screws in a desired position of adjustment. A lever 120 is secured at one end to the shaft 84 by screw 83 and is provided with a pair of lugs 122 and 124 adapted to be engaged by the screws 116 during oscillation of the control arm 110. It will be understood that the centering springs of the leveling valve 10 will normally maintain the lever 120 in the horizontal position shown wherein the lugs 122 and 124 will be spaced from the screws 116, which latter are adjusted to permit any desired free movement of the control lever 110. Under these conditions, the valve of the leveling valve will be lapped. During slight displacements of the control arm 110 within the limits of the lost motion between the screws 116 and the lugs 122 and 124, the valve 10 will not be operated and hence the supply of compressed air will be conserved. However, as soon as the displacements of the control arm are increased to an extent where the screws 116 contact and move either the lug 122 or the lug 124, the lever 120 will be correspondingly moved to operate the valve 10 to admit to or exhaust air from the vehicle air springs, depending upon the direction of rotation of the shaft 84. The construction of Figs. 6 and 7 may be used with either of the leveling valves disclosed in Figs. 3 or 5. In such event, while relatively small displacements of the arm 110 will not operate the leveling valves, as soon as the arm 110 moves the lever 120, the operation of the valves will be as heretofore described.

From the foregoing, the operation of the leveling valve of Fig. 3 in efficiently controlling the leveling action of the vehicle with changes in load conditions will be readily understood. For example, with the air springs deflated, control arm 18 will be moved upwardly, as viewed in Fig. 1 to cause upward movement of plungers 80 and 66 to open both the inlet valves 32 and 28 through rotation of the shaft 84 and eccentric roller 92. Quick charging of the air springs will then occur through the relatively large inlet orifice 52, compressed air being conducted to the springs by way of reservoir 21, conduit 22, port 50, orifice 52, past check valve 54 to chamber 30, past open inlet valve 28 to chamber 34, past open inlet valve 32 to chamber 68 and thence to outlet port 78. As the air springs are inflated, the control arm will be returned to the normal position illustrated in Fig. 1 and the valves 28 and 32 will successively return to the lapped position shown in Fig. 3. It will be understood that the same operation will occur when the load on the vehicle is increased and additional air is required in the air springs to maintain the vehicle body at a predetermined height above the axle.

In the event the vehicle loading is decreased, the valve of Fig. 3 will operate to rapidly exhaust the air springs so that the proper vehicle height may be re-attained. When this occurs, the control arm 18 of Fig. 1 will move downwardly to first open the exhaust valve at the top of plunger 66 and then open the exhaust valve at the top of plunger 80. Air will then be quickly exhausted from the air springs through port 78, chamber 68, larger exhaust bore 82, hollow exhaust tube 92 to the exhaust chamber 94 and from the latter to atmosphere through ports 104 and 106 in the cap 102. As the air springs are deflated, the control arm 18 will be returned to the normal position of Fig. 1 and the exhaust valves will be successively closed so that the valve 10 will reassume its lapped position.

It will be understood that during over-the-road travel of the vehicle, when the displacements of the lever 18 are relatively slight, the valve 10 will operate with restricted inlet to and exhaust of air from the air springs. For example, as the arm 18 moves a slight distance upwardly, as viewed in Fig. 1, inlet valve 32 only will be opened and air flow to the air springs will be determined by the restricted orifice 60. On the other hand, as arm 18 moves downwardly a slight distance, only the exhaust valve at the top of plunger 66 will be opened and air flow from the air springs to exhaust will be determined by the restricted orifice 72. Hence, under these conditions the air flow will be restricted and the supply of air will be conserved.

The operation of the other forms of the invention illustrated in Figs. 5, 6 and 7 has been fully set forth hereinbefore and further explanation is not necessary. It is desired to emphasize, however, that while the modification of Fig. 5 possesses a single capacity exhaust valve, it nevertheless retains the two-capacity inlet features of Fig. 3.

The arrangement of the control arm of Figs. 6 and 7 is especially effective in those cases where constant operation of the valve parts of the leveling valve is not desired.

While several forms of the invention have been shown and described herein, it will be understood by those skilled in the art that various changes may be resorted to without departing from the spirit of the invention. Reference will therefore be had to the appended claims for a definition of the limits of the invention.

What is claimed is:

1. Control valve mechanism for regulating the air pressure within a vehicle air spring for maintaining the vehicle frame a predetermined distance above the vehicle axle, comprising a leveling valve having a casing adapted to be mounted on the frame, valve means within the casing for controlling the flow of compressed air to and from the air spring at a predetermined low rate in accordance with slight relative movements between the frame and axle, other valve means within the casing for controlling the flow of compressed air to the air spring at a predetermined higher rate in accordance with greater relative movement between the frame and axle in one direction, and means actuated by relative frame and axle movement for actuating said valve means.

2. Control valve mechanism for regulating the air pressure within a vehicle air spring for maintaining the vehicle frame a predetermined distance above the vehicle axle, comprising a leveling valve having a casing adapted to be mounted on the frame, valve means within the casing for controlling the flow of compressed air to and from the air spring at a predetermined low rate in accordance with relative movements between the frame and axle of a predetermined extent, other valve means within the casing for increasing the rate of flow of compressed air to the air spring as said relative movements exceed said predetermined extent, and means actuated by relative frame and axle movement for actuating said valve means.

3. Control valve mechanism for regulating the air pressure within a vehicle air spring for maintaining the vehicle frame a predetermined distance above the vehicle axle, comprising a leveling valve having a casing adapted to be mounted on the frame, a control arm adapted to be connected with the axle, valve means within the casing and operable in accordance with displacements of said control arm a predetermined distance in either direction from a normal position for controlling the flow of compressed air to and from the air spring at a predetermined low rate, and other valve means within the casing for increasing the rate of flow of compressed air to the air spring when the displacement of said control arm in one direction exceeds said predetermined distance.

4. Control valve mechanism for regulating the air pressure within a vehicle air spring for maintaining the vehicle frame a predetermined distance above the vehicle axle, comprising a leveling valve having a casing adapted to be mounted on the frame, a control arm adapted to be connected with the axle, valve means within the casing and operable in accordance with displacements of said control arm a predetermined distance in either direction from a normal position for controlling the flow of compressed air to and from the air spring at a predetermined low rate, and other valve means within the casing for increasing the rate of flow of compressed air to and from the air spring when the displacements of said control arm in either direction exceed said predetermined distance.

5. Control valve mechanism for regulating the air pressure within a vehicle air spring for maintaining the vehicle frame a predetermined distance above the vehicle axle, comprising a leveling valve having a casing adapted to be mounted on the frame, a normally closed inlet valve within the casing, a second normally closed inlet valve spaced from the first inlet valve and having a metering orifice therethrough for restricting the rate of flow of compressed air to said air spring to a predetermined low rate when said first inlet valve is opened, said first inlet valve being movable to close said orifice and open the second inlet valve, means in the casing for increasing the rate of flow of compressed air to the air spring when the second inlet valve is opened, an exhaust valve plunger slidable in the casing and movable in one direction to successively open the first and second inlet valves and movable in the opposite direction to exhaust compressed air from the air spring at a predetermined rate, and means operable in accordance with relative movements between the vehicle frame and axle for moving said plunger.

6. Control valve mechanism for regulating the air pressure within a vehicle air spring for maintaining the vehicle frame a predetermined distance above the vehicle axle, comprising a leveling valve having a casing adapted to be mounted on the frame, a normally closed inlet valve within the casing, a second normally closed inlet valve spaced from the first inlet valve and having a metering orifice therethrough for restricting the rate of flow of compressed air to said air spring to a predetermined low rate when said first inlet valve is opened, said first inlet valve being movable to close said orifice and open the second inlet valve, a second metering orifice in the casing, larger than the first orifice for increasing the rate of flow of compressed air to the air spring when the second inlet valve is opened, an exhaust valve plunger slidable in the casing and movable in one direction to successively open the first and second inlet valves and movable in the opposite direction to exhaust compressed air from the air spring at a predetermined rate, and means operable in accordance with relative movements between the vehicle frame and axle for moving said plunger.

7. Control valve mechanism as set forth in claim 6 wherein the exhaust valve plunger is provided with a through bore constantly connected with an exhaust chamber and wherein the upper end of the plunger normally contacts the first inlet valve to close said bore.

8. Control valve mechanism for regulating the air pressure within a vehicle air spring for maintaining the vehicle frame a predetermined distance above the vehicle axle, comprising a leveling valve for controlling the flow of compressed air to and from said air spring in accordance with relative movements between the frame and axle, said valve having a casing adapted to be mounted on the frame, a shaft rotatably mounted in the casing for rotation about its axis for operating said leveling valve, a control arm having one end adapted to be connected with the vehicle axle and the other end rotatably mounted on said shaft, said arm extending at right angles to the axis of said shaft, a pair of spaced-apart abutments carried by said arm, and means for connecting said arm and shaft comprising a lever having one end connected to said shaft and the other end positioned between said abutments and spaced therefrom.

9. Control valve mechanism as set forth in claim 8 which comprises in addition, adjustable screws carried by said abutments for adjusting the distance between the latter and the other end of the lever.

References Cited in the file of this patent
UNITED STATES PATENTS

| | | |
|---|---|---|
| 1,179,015 | McCrosson | Apr. 11, 1916 |
| 1,655,729 | Jones | Jan. 10, 1928 |
| 1,821,206 | Caswell | Sept. 1, 1931 |
| 2,150,576 | Bell | Mar. 14, 1939 |
| 2,558,471 | Whitlock | June 26, 1951 |
| 2,670,201 | Rossman | Feb. 23, 1954 |
| 2,787,475 | Jackson | Apr. 2, 1957 |
| 2,882,068 | Faiver | Apr. 14, 1959 |